United States Patent [19]

Slattery

[11] Patent Number: 4,534,333
[45] Date of Patent: Aug. 13, 1985

[54] INTERNAL COMBUSTION ENGINE WITH AIR-FUEL MIXTURE HEATING

[75] Inventor: Gordon C. Slattery, Omro, Wis.

[73] Assignee: Brunswick Corporation, Skokie, Ill.

[21] Appl. No.: 668,185

[22] Filed: Nov. 5, 1984

Related U.S. Application Data

[63] Continuation of Ser. No. 452,913, Dec. 27, 1982, abandoned.

[51] Int. Cl.³ ............................................. F02M 31/00
[52] U.S. Cl. .................................. 123/545; 123/557; 261/144
[58] Field of Search ............... 123/525, 575, 576, 577, 123/578, 557, 585, 545, 547; 261/144, 145

[56] References Cited

U.S. PATENT DOCUMENTS

| 1,610,152 | 12/1926 | Renard | 261/145 |
|---|---|---|---|
| 1,665,630 | 4/1928 | Lamotke | 123/525 |
| 2,150,764 | 3/1939 | Farineau | 123/525 |
| 2,609,801 | 9/1952 | Kiekhaefer | . |
| 3,554,174 | 1/1971 | Clawson | 123/432 |
| 3,762,378 | 10/1973 | Bitonti | 123/557 |
| 4,019,477 | 4/1977 | Overton | 123/577 |
| 4,030,453 | 6/1977 | Sugimoto | 123/557 |
| 4,040,400 | 8/1977 | Kiener | 123/557 |
| 4,201,167 | 5/1980 | Bayley | 123/557 |
| 4,491,119 | 1/1985 | Feszu | 123/557 |

FOREIGN PATENT DOCUMENTS

| 2848654 | 8/1979 | Fed. Rep. of Germany | 123/557 |
|---|---|---|---|
| 388713 | 3/1933 | United Kingdom | . |
| 1095610 | 12/1967 | United Kingdom | . |
| 1301141 | 12/1972 | United Kingdom | . |
| 1438771 | 6/1976 | United Kingdom | . |
| 1446898 | 8/1976 | United Kingdom | . |
| 1497268 | 1/1978 | United Kingdom | . |

Primary Examiner—Ronald H. Lazarus
Attorney, Agent, or Firm—Andrus, Sceales, Starke & Sawall

[57] ABSTRACT

An internal combustion engine (1) includes a supplemental fuel passage (26, 27) which connects the carburetor (9) to the exhaust chest cover (28). A supplemental air inlet having a metering orifice (36) and passage (35) connects to the supplemental fuel passage. The resultant air-fuel mixture is heated before entry into the combustion chamber by passing the mixture through a heating passage (32) directly in front of the exhaust ports (13). When the engine is at idle with a completely closed throttle valve (19), the entire air-fuel supply for the engine is provided through the supplemental fuel and air passages and is heated in the heating passage prior to combustion. At increasingly open throttle, air-fuel is increasingly provided from the conventional primary carburetor output, with the heated air-fuel mixture being supplied in gradually decreasing amounts.

2 Claims, 8 Drawing Figures

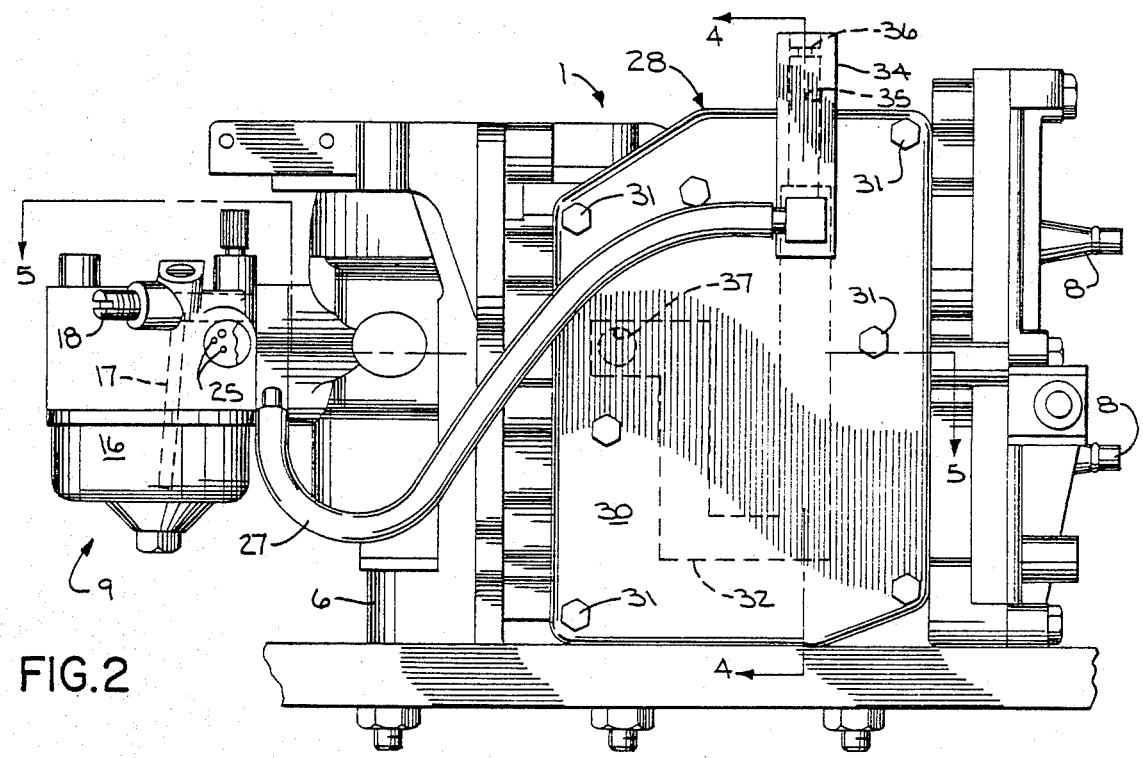
FIG.2
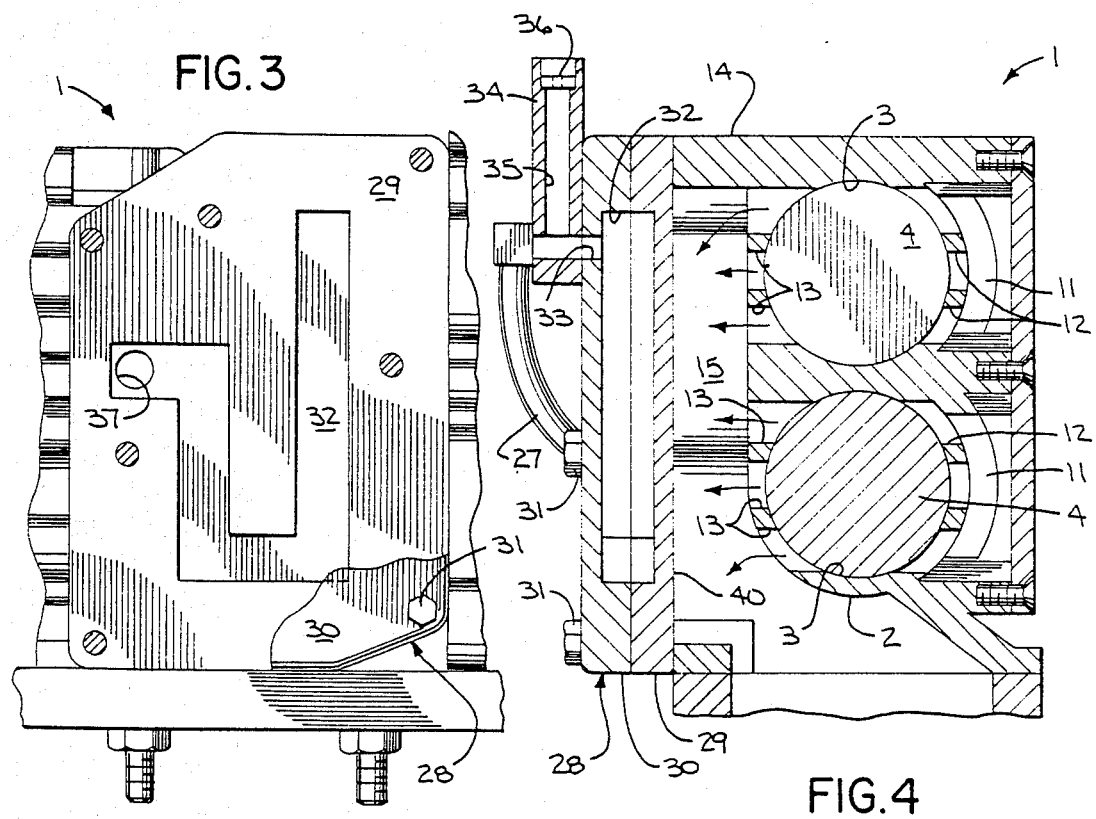
FIG.3
FIG.4

INTERNAL COMBUSTION ENGINE WITH AIR-FUEL MIXTURE HEATING

This application is a continuation of application Ser. No. 06/452,913, filed Dec. 27, 1982 now abandoned.

DESCRIPTION

TECHNICAL FIELD

The invention relates to an internal combustion engine with a heated air-fuel supply system.

BACKGROUND ART

Internal combustion engines have tended to run rough at idle and low speeds, with smoother running at high speeds. It has been desired to improve the operation characteristics of such engines at their idle and lower speeds.

Furthermore, most internal combustion engines have been designed to operate on gasoline. However, less volatile fuels such as kerosene or the like would be preferable in many instances due to their lower cost. Previous attempts to utilize kerosene have not been entirely successful, especially in water cooled marine engines, because the mixture of air and lower octane fuel was not hot enough at idle and slow speeds to ignite in the combustion chamber.

One known manufacturer has built an engine which uses two fuel systems. Gasoline is used when the engine is started, at idle and at part throttle. As the throttle is opened wider, with accompanying hotter operation, kerosene gradually supplants the gasoline.

In addition, kerosene burning farm tractor engines have run the intake manifold inside of the exhaust manifold to heat the air-fuel mixture.

DISCLOSURE OF INVENTION

An internal combustion engine includes a supplemental fuel passage which connects the carburetor to the exhaust chest cover. A supplemental air inlet having a metering orifice and passage connects to the supplemental fuel passage. The resultant air-fuel mixture is heated before entry into the combustion chamber by passing the mixture through a heating passage directly in front of the exhaust ports. When the engine is at idle with a completely closed throttle valve, the entire air-fuel supply for the engine is provided through the supplemental fuel and air passages and is heated in the heating passage prior to combustion. At increasingly open throttle, air-fuel is increasingly provided from the conventional primary carburetor output, with the heated air-fuel mixture being supplied in gradually decreasing amounts.

BRIEF DESCRIPTION OF THE DRAWINGS

FIG. 2 is a front elevation of the engine;

FIG. 3 is a fragmentary elevational view of the exhaust chest cover area, with the outer cover portion partially broken away;

FIG. 4 is a vertical section taken on line 4—4 of FIG. (2);

BEST MODE FOR CARRYING OUT THE INVENTION

Figure 1:
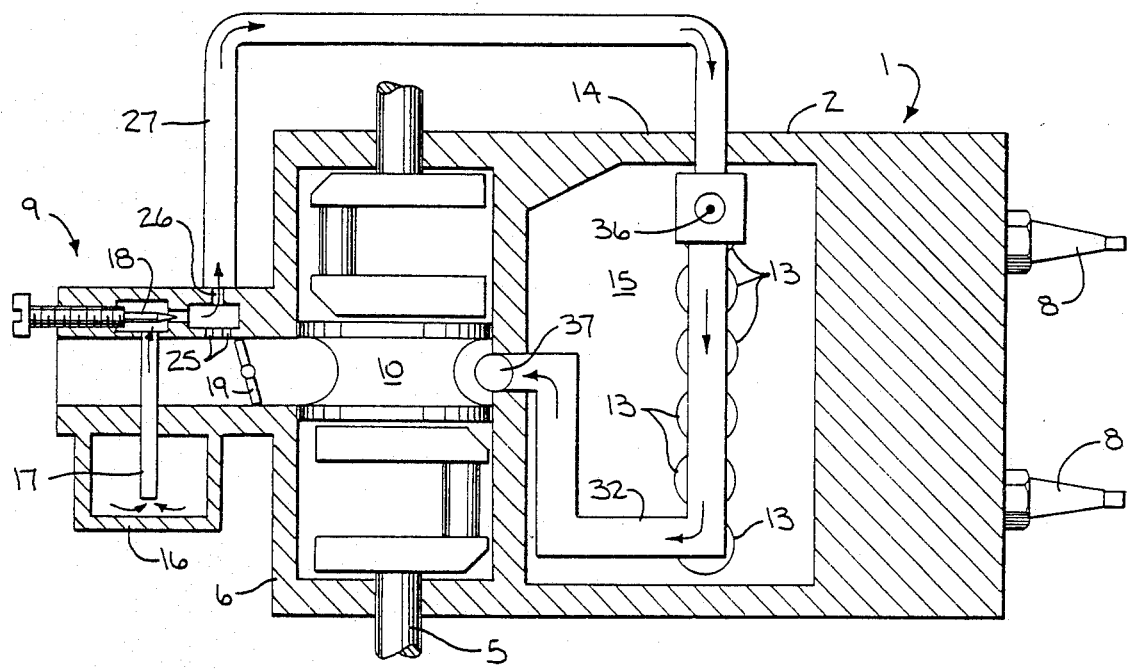
FIG. 1 is a schematic showing of an internal combustion engine which incorporates the air-fuel heater.
Figure 8:
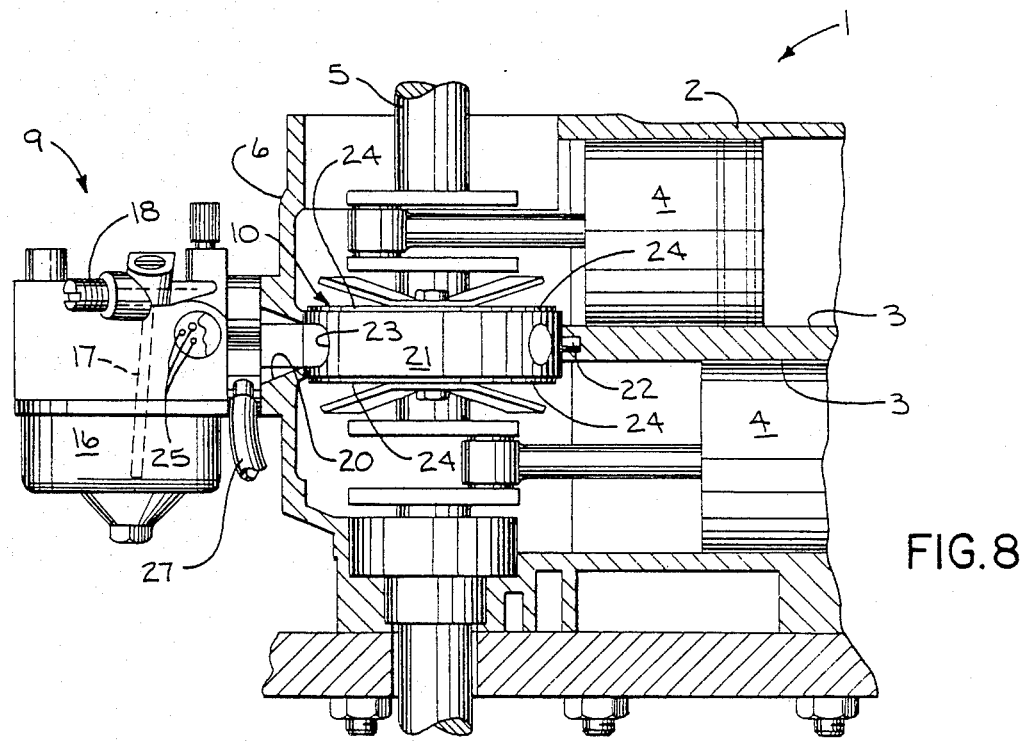
FIG. 8 is a section taken on line 8—8 of FIG. 5.

The internal combustion engine 1 shown in the drawings is of the two-cycle type and includes a cylinder block 2 which in this instance has a pair of cylinders 3 which have the usual pistons 4 disposed therein. Pistons 4 are conncted in the usual manner to a crankshaft 5 disposed within a crankcase 6 mounted to cylinder block 2, as by bolts 7. The usual spark plugs 8 are provided to fire the engine.

A fuel-air mixture is provided in the normal fashion by a carburetor 9, which is mounted to crankcase 6, and an inlet valve 10 and transfer passage 11 to inlet ports 12 in cylinders 3. Exhaust ports 13 are provided in the cylinder walls oppositely from inlet ports 12 and provide discharge of the products of combustion into an exhaust chest 14 forming a cavity 15, and hence out of engine 1. See FIG. 4. Reference is made to U.S. Pat. No. 2,609,801 for a somewhat similar arrangement.

Figure 6:
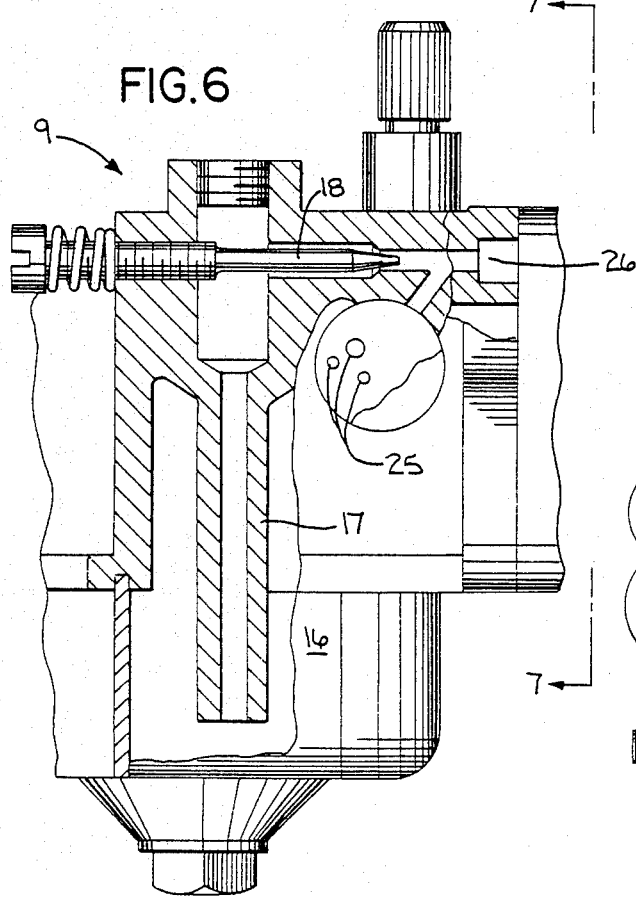
FIG. 6 is a horizontal section through the carburetor taken on line 6—6 of FIG. 5.
Figure 7:
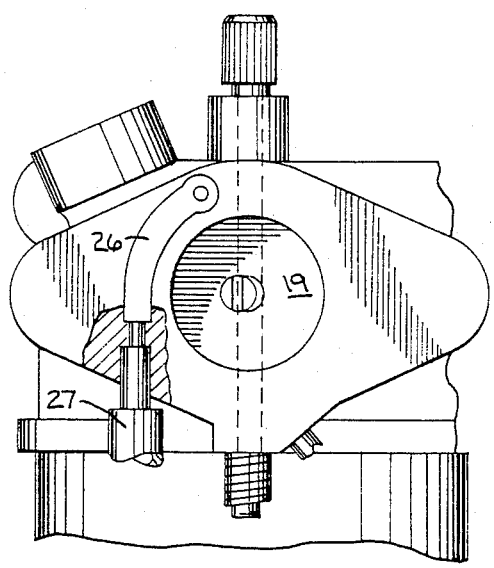
FIG. 7 is a vertical section taken on line 7—7 of FIG. 6.

Referring to FIGS. 1, 6 and 7, carburetor 9 includes the usual float bowl 16, siphon 17 and needle valve 18. Air is drawn through carburetor 9, is normally mixed with fuel in the usual manner, and then drawn through a throttle valve 19 in the carburetor throat and into a passage 20 in crankcase 6.

In the present embodiment, inlet valve 10 is of the "reed" one-way type and comprises a fixed cylindrical disc-like valve body 21 mounted between cylinders 3 in crankcase 6 and held against rotation as by a pin 22. Crankshaft 5 rotatably passes through a central opening in valve body 21. Body 21 is provided with an internal generally U-shaped passage 23 which registers with crankcase passage 20. Internal passage 23 is connected through four springable reed plates 24 on each face of valve body 21 to provide for alternate one-way passage of the air-fuel mixture from carburetor 9 into cylinders 3 during piston reciprocation.

In order to operate the engine smoothly and/or with less volatile fuel at idle and low speeds, means are provided to supply a supplemental air-fuel mixture to the crankcase under certain conditions, and with this supplemental mixture being heated.

For this purpose, throttle valve 19 is imperforate as shown in FIG. 7 and, when closed, completely blocks the entrance to crankcase passage 20 from carburetor 9. In addition carburetor 9, which normally includes a connecting primary fuel passage 25 between needle valve 18 and the area of the carburetor throat just upstream from throttle valve 19, is provided with a secondary fuel passage 26 forming a fuel discharge port which also communicates with needle valve 18.

Secondary fuel passage 26 connects through a conduit, such as a hose 27 disposed externally of engine 1, to the area of exhaust chest 14. Chest 14 is enclosed by a cover means 28 which in this instance comprises a pair of parallel generally co-extensive plates 29 and 30 arranged in contacting relationship and secured to cylinder block 2 as by bolts 31. Plates 29 and 30 are provided with an internal heating passage 32 which lies in the path of exhaust ports 13 and which is shown as generally L-shaped.

One end of passage 32 connects through a port 33 in outer plate 30 to an inwardly extending elongated housing 34 forming a flow channel 35 therein. Fuel hose 27 connects into channel 35 adjacent port 33. The upper end of housing 34 is formed to provide an air metering inlet orifice 36 which forms a restricted entrance for external air into channel 35. The cross section of orifice 36 is substantially less than that of passage 32, and in fact it is the only restriction in the system.

The other end of passage 32 connects through a port 37 in inner plate 29 and hence through a passage 38 in cylinder block 2. Passage 38 registers with a further passage 39 in valve body 21, with the latter passage connecting to the U-shaped passage 23 in valve body 21.

Thus, a supplemental connection is provided from carburetor 9, through fuel hose 27, through channel 35 where fuel and air are mixed, and finally into the crankcase.

Figure 5:
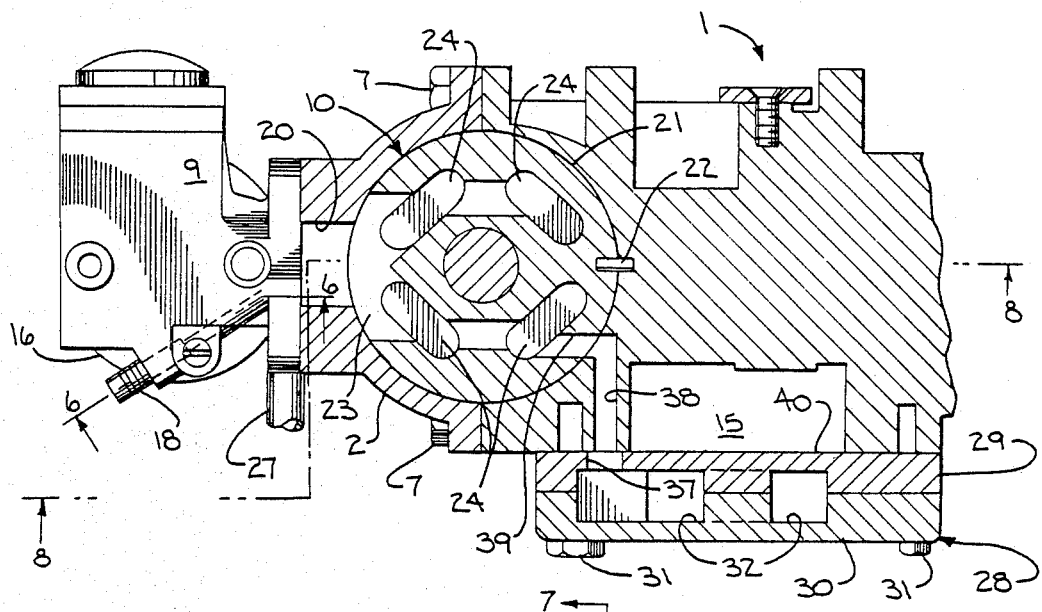
FIG. 5 is a horizontal section taken on line 5—5 of FIG. (2)

In operation of the device, the engine is started and idled with throttle valve 19 completely closed so that no primary air or fuel can pass through the carburetor throat into crankcase 6. The negative pressure created by piston reciprocation causes fuel to be drawn through secondary discharge port 26 and hose 27 and hence into flow channel 35. Simultaneously, the negative pressure draws external ambient air through metering orifice 36 and also into flow channel 35, where the air and fuel are mixed. The supplemental air-fuel mixture is then drawn into heating passage 32 in the exhaust chest cover means 38 and is conducted therethrough. During this time, exhaust emanating from cylinder exhaust ports 13 impinges on the inner face 40 of inner cover plate 29, which forms a wall of heating passage 32. See FIG. 4. This serves to heat the air-fuel mixture passing through the passage to enhance its combustion properties. The heated mixture then flows through passages 38, 39 and 23 (see FIG. 5) and is discharged through valve plates 24 into crankcase 6 and finally into cylinders 3 alternately in response to piston reciprocation.

As throttle valve 19 is opened partially to provide low engine speed, negative pressure also draws a limited amount of a primary air-fuel mixture directly through carburetor 9 and passage 20 and also through valve plates 24 and into crankcase 6 and cylinders 3. However, at lower engine speeds, the supplemental heated air-fuel mixture provides a substantial percentage of the total mixture supplied for combustion.

As throttle valve 19 is gradually opened farther and the engine runs faster, the amount of unheated primary air-fuel mixture supplied directly by the carburetor increased while the heated supplemental mixture decreases in inverse proportion. At wide open throttle, only a negligible amount, if any, of heated air-fuel mixture is provided to the cylinders, although external air continues to be drawn in through orifice 36 and is heated before being injected into crankcase 6.

The supplemental supply system is thus selectively responsive to the setting of throttle valve 19 to supply a heated air-fuel mixture to the engine during idle and low speed, and to a limited extent at high speeds up to wide open throttle.

The result is that additional heat is supplied to the fuel passing to the combustion chambers of cylinders 3 when it is needed most; that is, at idle and low speed when the cylinder walls are cooler. This supplemental heat is gradually reduced at higher speeds and hotter operating temperatures.

It has been found that, even when conventional gasoline is the only fuel, the engine will run smoother at idle and low speeds. In addition, when the primary fuel is of the less volatile type, such as kerosene, the additional heat selectively supplied to the air-fuel mixture will permit spark ignition and smooth running at idle and low speeds, and in fact at all throttle settings.

By heating the air-fuel mixture after the air is metered at orifice 36, problems of metering caused by major temperature changes are avoided.

In some instances, it may be desired to initially start engine 1 with a small supply of gasoline and then to switch over to a less volatile fuel immediately when idling begins. Furthermore, while the disclosed device involves a two-cycle multi-cylinder engine, the present concepts could also be applied to an engine of the single cylinder or four-cycle type.

I claim:

1. In an internal combustion engine, the combination comprising:
   (a) a cylinder block having a cylinder and reciprocable piston disposed therein, said cylinder having a wall with an intake port and an exhaust port therein,
   (b) an exhaust chest disposed in said cylinder block for receipt and transfer of exhaust gases from said exhaust port,
   (c) a cover for said exhaust chest and with said cover disposed in facing relationship with said exhaust port,
   (d) a carburetor connected to supply a primary air-fuel mixture to said intake port of said cylinder, said carburetor having a primary fuel passage and a throttle valve adjustable between closed and open positions,
   (e) and means connected between said carburetor and said intake port of said cylinder for supplying a supplemental heated air-fuel mixture to said cylinder at idle and low engine speeds,
   (f) said supplemental air-fuel mixture supplying means including passage means disposed in facing relationship with said exhaust port of said cylinder wall for conducting said supplemental mixture therethrough so that exhaust emanating from said exhaust port into said exhaust chest heats said supplemental mixture,
   (g) said passage means is disposed in said cover having one end connected to said carburetor and its other end connected to said intake port of said cylinder, and
   (h) the connection of said passage means to said carburetor includes a secondary fuel passage in said carburetor, means connecting said secondary fuel passage to said passage means in said cover, and external air inlet means disposed in said connecting means to provide said supplemental air-fuel mixture, said external air inlet means includes a restrictive air metering orifice of smaller cross section than said connecting means.

2. The combinantion of claim 1 which includes:
   (a) a crankcase disposed on said cylinder block,
   (b) valve means disposed in said crankcase and connected to said carburetor to receive said primary air-fuel mixture therefrom, said valve means being connected to said inlet port of said cylinder for supplying said primary air-fuel mixture thereto,
   (c) and means connecting said other end of said passage means in said cover through said cylinder block to said valve means for supplying said heated secondary air-fuel mixture through said valve means to said intake port of said cylinder wall.

* * * * *

UNITED STATES PATENT AND TRADEMARK OFFICE
CERTIFICATE OF CORRECTION

PATENT NO. : 4,534,333

DATED : August 13, 1985

INVENTOR(S) : GORDON C. SLATTERY

It is certified that error appears in the above-identified patent and that said Letters Patent is hereby corrected as shown below:

In Column 2, line 11, cancel "conncted" and substitute therefor --connected--

In Column 2, line 67, cancel "inwardly" and substitute therefor --upwardly--

In Column 3, line 48, cancel "increased" and substitute therefor --increases--

In Column 4, line 7, cancel "desired" and substitute therefor --desirable--

Signed and Sealed this

Twenty-second Day of October 1985

[SEAL]

*Attest:*

DONALD J. QUIGG

*Attesting Officer*

*Commissioner of Patents and Trademarks—Designate*